US011590484B2

(12) United States Patent
Koch et al.

(10) Patent No.: US 11,590,484 B2
(45) Date of Patent: Feb. 28, 2023

(54) CONTACTLESS LEVELING OF A WASHCOAT SUSPENSION

(71) Applicant: UMICORE AG & CO. KG, Hanau-Wolfgang (DE)

(72) Inventors: Juergen Koch, Hanau (DE); Astrid Mueller, Alzenau (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 16/628,308

(22) PCT Filed: Jul. 5, 2018

(86) PCT No.: PCT/EP2018/068199
§ 371 (c)(1),
(2) Date: Jan. 3, 2020

(87) PCT Pub. No.: WO2019/008082
PCT Pub. Date: Oct. 1, 2019

(65) Prior Publication Data
US 2020/0215523 A1   Jul. 9, 2020

(30) Foreign Application Priority Data

Jul. 6, 2017   (DE) .................... 10 2017 115 138.9

(51) Int. Cl.
| *B01J 35/04* | (2006.01) |
| *B01J 37/02* | (2006.01) |
| *B01D 53/94* | (2006.01) |
| *B01J 35/00* | (2006.01) |

(52) U.S. Cl.
CPC ........... *B01J 35/04* (2013.01); *B01J 37/0215* (2013.01); *B01D 53/9409* (2013.01); *B01D 2255/1021* (2013.01); *B01D 2255/1023* (2013.01); *B01D 2255/9155* (2013.01); *B01J 35/0006* (2013.01); *B01J 37/0246* (2013.01)

(58) Field of Classification Search
CPC .................................................... B01J 37/0215
See application file for complete search history.

(56) References Cited

U.S. PATENT DOCUMENTS

| 3,948,213 A | 4/1976 | Hoyer et al. |
| 4,039,482 A | 8/1977 | Hoyer et al. |
| 4,066,801 A | 1/1978 | Hoyer et al. |
| 4,609,563 A | 9/1986 | Shimrock et al. |
| 5,077,093 A | 12/1991 | Baumgartner et al. |
| 6,478,874 B1 | 11/2002 | Rosynsky et al. |
| 6,548,105 B2 | 4/2003 | Kiessling et al. |
| 6,599,570 B1 | 7/2003 | Aderhold et al. |
| 7,094,728 B2 | 8/2006 | Yan et al. |
| 8,640,440 B2 | 2/2014 | Klingmann et al. |
| 8,834,972 B2 | 9/2014 | Hasselmann |
| 9,144,796 B1 | 9/2015 | Bennett et al. |

| 2007/0128354 A1* | 6/2007 | Suzuki ............... B01J 35/04 427/238 |
| 2010/0221449 A1 | 9/2010 | Schlatterbeck et al. |
| 2012/0321816 A1 | 12/2012 | Chopra et al. |

FOREIGN PATENT DOCUMENTS

| DE | 25 46 489 A1 | 4/1976 | |
| DE | 101 14 328 A1 | 10/2002 | |
| DE | 10 2008 012 643 A1 | 9/2009 | |
| DE | 10 2009 037 381 A1 | 2/2011 | |
| EP | 0 398 128 A1 | 11/1990 | |
| EP | 0 648 535 A1 | 4/1995 | |
| EP | 1 136 462 A1 | 9/2001 | |
| EP | 1 064 094 B1 | 9/2002 | |
| EP | 1 900 442 A1 | 3/2008 | |
| EP | 1900442 A1 * | 3/2008 | .......... B01J 37/0215 |
| EP | 1 309 775 B1 | 6/2008 | |
| EP | 1 663 458 B1 | 1/2009 | |
| EP | 2 042 225 A1 | 4/2009 | |
| EP | 2 415 522 A1 | 2/2012 | |
| EP | 2 521 618 B1 | 8/2013 | |
| EP | 2 321 048 B1 | 5/2014 | |
| JP | H10-229028 A | 8/1998 | |
| JP | 2002-506720 A | 3/2002 | |
| JP | 2002268146 * | 9/2002 | ............. G03B 21/62 |
| JP | 2008-302304 | 12/2008 | |
| JP | 5378659 B2 | 12/2013 | |
| JP | 2014-205108 A | 10/2014 | |
| WO | 99/47260 | 9/1999 | |
| WO | 2007/007370 | 1/2007 | |
| WO | 2010/015573 A2 | 2/2010 | |
| WO | 2015/140630 A1 | 9/2015 | |
| WO | 2016/023808 A | 2/2016 | |

OTHER PUBLICATIONS

Ampo, Leveling Viscous Fluids Using Ultrasonic Waves, Japanese Journal of Applied Physics, vol. 43 No. 5B, 2004, p. 2857-2861 (Year: 2004).*
International Search Report for PCT/EP2018/068199, dated Oct. 19, 2018 (6pgs. with English Translation).
K Ampo, et al. "Leveling Viscous Fluids Using Ultrasonic Waves" Japanese Journal of Applied Physics vol. 43, No. 5B, 2004, pp. 2857-2861.
International Preliminary Report on Patentability dated Jan. 7, 2020 for International Patent Application No. PCT/EP2018/068199 (7 pages in German with English translation).
DIN EN ISO 3104. Nov. 2017. pp. 1-32 in German and pp. 32-59 in English.
DIN EN ISO 3219. 1994 (7 pages in German with Machine Translation).

(Continued)

*Primary Examiner* — Tabatha L Penny
(74) *Attorney, Agent, or Firm* — Smith, Gambrell & Russell, LLP

(57) ABSTRACT

A process for coating substrates of motor vehicle exhaust gas catalysts is described, and includes steps of applying a suspension (e.g., washcoat) to a substrate, allowing a shear force to act on the applied washcoat, as in pressure transmitted by gas (e.g., air), and then sucking and/or pressing the washcoat into the substrate. The process in inclusive of providing the suspension (washcoat) containing the catalytic material from above in a metered charge process. An apparatus for carrying out the noted process steps is also featured.

19 Claims, 1 Drawing Sheet

(56) References Cited

OTHER PUBLICATIONS https://www.conatex.com/catalog/physik_lehrmittel/schulerubungen/energieumwandlung_elektrochemie_energiequellen_dynamot/product-luftstromerzeuger/sku-1001916#.WS1elk2wdeU, accessed Dec. 29, 2020, 1 page with English translation.
https://www.ziegener-frick.de/fileadmin/downloads/pdf/lufttechnik/geblaeseluft/mistral/Mistral_SSHD/MIST_RAL_185155_Produktinfo.pdf, accessed Dec. 29, 2020. 3 pages with English translation.
http://www.labo.de/marktuebersichten/ultraschall-homogenisatoren.htm, , accessed Dec. 29, 2020. 2 pages with English translation,.
Wikipedia, Luftklinge, https://de.wikipedia.org/wiki/Luftklinge, accessed Dec. 29, 2020. 3 pages with English translation.
Strukturviskosit, Wikipedia, https://de.wikipedia.org/wiki/Strukturviskosit%C3%A4t, accessed Dec. 29, 2020. 4 pages with English translation.
Indian Examination Report dated Jul. 12, 2021 in Indian Patent Application No. 202047004640 (5 pages).
Japanese Office Action dated May 30, 2022 in Japanese Patent Application No. 2019-571664 (8 pages in Japanese with English translation.).
Korean Office Action dated Nov. 28, 2022 for Korean Patent Application No. 10-2020-7000300 (5 pages in Korean with English translation).

\* cited by examiner

Fig. 1: a) b) c) d)
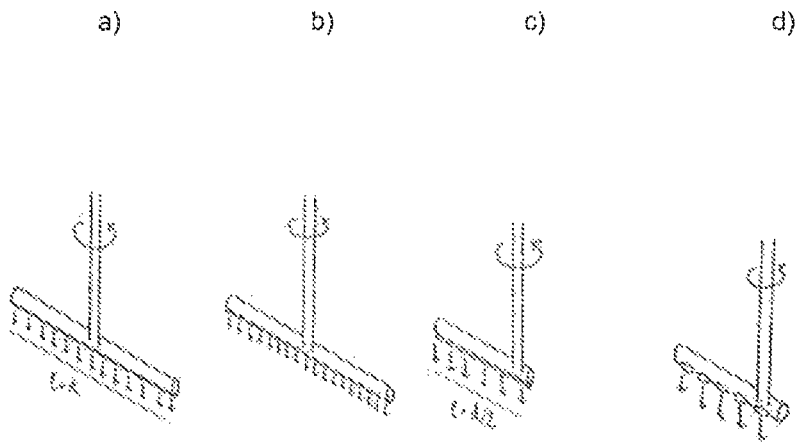
Fig. 2: a) b)
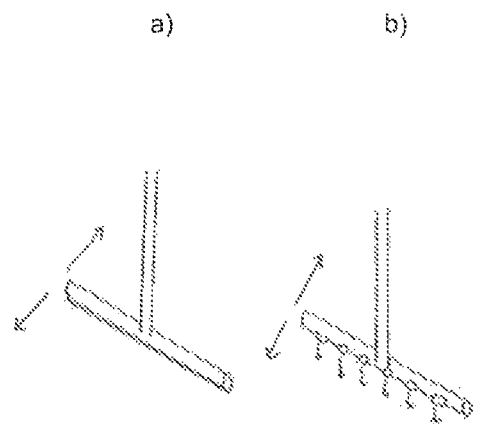
Fig. 3:
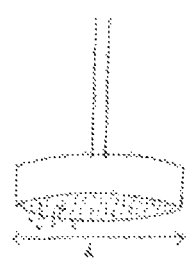

CONTACTLESS LEVELING OF A WASHCOAT SUSPENSION

The present invention relates to a process and an apparatus for coating substrates of motor vehicle exhaust gas catalysts. In particular, the invention describes an improvement in such coating processes in which a suspension (washcoat) containing the catalytically active material is applied to such a substrate (substrate monolith) from above (so-called "metered charge" process).

The exhaust gas of combustion engines in motor vehicles typically contains the harmful gases carbon monoxide (CO) and hydrocarbons (HC), nitrogen oxides ($NO_x$) and possibly sulfur oxides ($SO_x$), as well as particulates that mostly consist of soot residues and possibly adherent organic agglomerates. These are called primary emissions. CO, HC, and particulates are the products of the incomplete combustion of the fuel inside the combustion chamber of the engine. Nitrogen oxides form in the cylinder from nitrogen and oxygen in the intake air when combustion temperatures locally exceed 1400° C. Sulfur oxides result from the combustion of organic sulfur compounds, small amounts of which are always present in non-synthetic fuels. In order to remove these emissions, which are harmful to health and environment, from the exhaust gases of motor vehicles, a variety of catalytic technologies for the purification of exhaust gases have been developed, the fundamental principle of which is usually based upon guiding the exhaust gas that needs purification over a flow-through or wall-flow honeycomb body or monolith with a catalytically active coating applied thereto. The catalyst facilitates the chemical reaction of different exhaust gas components, while forming non-hazardous products, such as carbon dioxide and water.

The flow-through or wall-flow monoliths just described are accordingly also called catalyst substrates, substrates or substrate monoliths as they carry the catalytically active coating on their surface or in the pores forming this surface. The catalytically active coating is often applied to the catalyst substrate in the form of a suspension in a so-called coating operation. Many such processes have been published by automotive exhaust gas catalytic converter manufacturers in the past (EP1064094B1, EP2521618B1, WO10015573A2, EP1136462B1).

U.S. Pat. No. 6,478,874 states that a vacuum is used to draw a washcoat suspension upwardly through the channels of a substrate monolith. U.S. Pat. No. 4,609,563 also describes a process in which a metered charging system is used for the catalytic coating of a substrate. This system comprises a process of coating a ceramic monolithic substrate with a precisely controlled, predetermined amount of the washcoat suspension using a vacuum (hereinafter "metered charge"). The monolithic substrate is immersed in a quantitatively determined amount of washcoat suspension. The washcoat suspension is then drawn by the vacuum into the substrate monolith. In this case, however, it is difficult to coat the monolithic substrate in such a way that the coating profiles of the channels in the monolithic substrate are uniform.

In contrast, a process is also established in which a specific amount of washcoat suspension (metered charge) is applied to the top side of an upright substrate monolith, this amount being such that it is practically completely retained within the monolith provided (U.S. Pat. No. 6,599,570). By means of a vacuum/pressure device acting on one of the ends of the monolith, the washcoat suspension is sucked/pressed entirely into the monolith without excess suspension escaping at the lower end of the monolith (WO9947260A1). See in this context also JP5378659B2, EP2415522A1 and JP2014205108A2 of the Cataler company.

The partially highly viscous washcoat suspensions, which generally also have a high flow limit, routinely form an uneven and non-uniform surface when applied to an uprightly oriented catalyst substrate (substrate monolith). During suction into the substrate, this then results in non-uniform coating front being able to form and the coating suspension being sucked into the substrate to different extents. In particular in the case of partial coatings for producing zoned products, a homogeneous distribution is of particular importance in order to ensure that a reproducible, uniform catalytic activity is ensured over the entire length and cross-section of the substrate.

Leveling of washcoat suspensions on the substrate monolith is known. EP1900442A1 of Cataler describes a process in which the applied washcoat is smoothed by centrifugal forces during rotation of the substrate or by vibrating the substrate. However, this process has the disadvantage that the mechanical stress on the catalyst substrate due to the rotation or vibration leads to damage to or flaking of the extremely sensitive, thin-walled honeycomb structure. Furthermore, by introducing shear forces into the entire quantity of washcoat applied, its rheological properties are influenced in such a way that an undesired penetration into the channels can already take place before the suction pulse. EP0398128A1 of Degussa AG discloses a process in which the substrate monolith is rotated during the application of the washcoat suspension. This ensures uniform application of the washcoat to the substrate; however, no smoothing or leveling of the surface takes place.

US2010221449A1 describes a process for removing undesired structures and defects from a lacquer layer applied to a substrate by blowing an air stream thereonto. The effectiveness of the air stream may be supported by the use of ultrasound. The smoothing unit in this case is part of a complex coating system consisting of an application unit (printer), smoothing unit and drying unit. Paper or cardboard with a thin (<1 mm) lacquer layer is coated with this system.

Ampo, K. et al. "Leveling viscous fluids using ultrasonic waves", JJAPS, (2004), vol. 43, pp. 2857-2861 describes a process for smoothing viscous liquids, in this case a photoresist material on a substrate, using ultrasound technology. This publication describes tests for smoothing liquids (0.01 Pa*s), which have a very low viscosity in comparison to washcoat, in thin layers on non-porous substrates. US2012321816A1 claims a method for smoothing thin layers (ca. 100 μm) of high-viscosity gel inks (0.106 Pa*s) using ultrasound.

The object of the present invention was to provide an improved process and a correspondingly operating apparatus for coating substrate monoliths with a washcoat suspension for use as motor vehicle exhaust gas catalysts. The process should ensure that, in particular, zone-coated catalysts with a uniform zone boundary or an optimally uniform zone profile can be produced. A process functioning in this way should lead to fewer rejects and to products which have better performance in exhaust gas purification. Such a process and such an apparatus would therefore be preferred from an economic and ecological point of view.

BRIEF DESCRIPTON OF THE DRAWINGS

FIGS. 1 to 3 show various embodiments of gas nozzles with which the gas, in particular air, can be directed onto the surface of the applied washcoat suspension.

DETAILED DESCRIPTION

These and other objects resulting in an obvious manner from the prior art are achieved by a process and a method with the features of the present claim 1 and of claim 11. The dependent claims are aimed at further improved embodiments of the teaching according to the invention.

By applying the washcoat suspension to one end of an upright substrate monolith in a first step in a process for coating a substrate monolith of the flow-through or wall-flow type with a washcoat suspension, allowing a shear force in the form of pressure transmitted by gas, in particular air, to act on the surface of the washcoat suspension in a following step and subsequently sucking and/or pressing the washcoat suspension into the substrate monolith, the object posed is advantageously achieved but not in an obvious manner.

Surprisingly, it was found that, by the action of a gas stream, not only very thin layers of viscous liquids in the μm range can be smoothed on the surface, but ceramic suspensions of high viscosity (e.g., up to several 100 Pa*s) and very pronounced flow limits (e.g., 100 Pa) in thick layers (0.5 to 15 cm) can also be smoothed and leveled. Insofar as is known, the use of laminar or turbulent as well as continuously or periodically intermittent gas streams for contactless leveling of thick washcoat layers has not yet been described in the prior art.

The shear force in the form of pressure required for smoothing can preferably be transmitted by an air stream. However, it may also be necessary for other gases to be used for this purpose, such as inert gases or reducing gases. The stream can then be provided according to knowledge familiar to the person skilled in the art by means of pressure tanks or pressure cylinders with such gases. In a preferred embodiment of the present invention, the shear force in the form of pressure is generated by a method selected from the group consisting of a continuous gas/air stream or a pulsating gas/air stream, or a mixture thereof. As already indicated, the gas/air stream can have a laminar or turbulent character. The person skilled in the art knows how such air streams or gas streams can be generated (https://www.ziegener-frick.de/fileadmin/downloads/pdf/lufttechnik/geblaeseluft/mistral/Mistral_SSHD/MISTRAL_185155_Produktinfo.pdf; https://www.conatex.com/catalog/physik_lehrmittel/schulerubungen/energieumwandlung_elektrochemie_energiequellen_dynamot/product-luftstromerzeuger/sku-1001916#.WS1elk2wdeU). The person skilled in the art can optimize the parameters necessary for this purpose, such as flow velocity, distance from the washcoat suspension, movement of the stream, etc. by means of routine measures. The result should be that the need for leveling the applied washcoat suspension by external vibration of the fragile substrate monolith can be reduced as much as possible. In a very preferred embodiment, the process according to the invention therefore dispenses with any further method beyond the measure according to the invention in order to achieve leveling of the applied washcoat suspension. In this case, leveling takes place exclusively in a contactless manner by the transmission of the shear force by air or a gas by means of a pressure.

In a further preferred embodiment, the present invention is aimed at a process for coating substrate monoliths with a washcoat suspension in which the shear force in the form of pressure acting on the surface of the applied washcoat suspension by means of a gas, in particular air, is an alternating force action. This is meant in the sense that the pressure acting on the surface of the applied washcoat suspension by the gas changes over time in such a way that the pressure is reduced continuously or stepwise during the duration of the action. This is to be understood as meaning that after reaching the flow limit of the washcoat suspension, only a lower force is needed to accomplish the leveling of the surface thereof.

It should be noted in this respect that the pressure acting via the gas is not so high that the washcoat suspension is sprayed up or otherwise adversely affected. It should also not be so low that no effects can be realized within an appropriate period of time. Preferably, the acting pressure should be of such a magnitude that the shear force introduced per area exceeds the flow limit of the washcoat used and thus brings it into a flowable state.

According to a preferred method, the pressure on the surface of the applied washcoat suspension can be provided by one or more sound- or pressure-wave generators, preferably a high-frequency ultrasound resonator. In this case, the ultrasound resonator does not immerse in the suspension but generates sound pressure waves, which act on the liquid surface, by ultrasonic oscillation in the air at a certain distance from the washcoat surface. A common source of ultrasound (e.g., http://www.labo.de/marktuebersichten/marktuebersicht---labo-marktuebersicht-ultraschall-homogenisatoren.htm) can be oriented toward the surface of the washcoat suspension according to the person skilled in the art. Within the scope of the invention, the suspension present on the substrate monolith is then exposed to ultrasound for a sufficient period of time. Preferably, the shear force is generated by ultrasound at a frequency of about 18,000 to about 90,000 Hz, preferably 18,000-60,000 Hz, and particularly preferably 19,000-43,000 Hz.

For example, the ultrasound processor generates longitudinal mechanical oscillations in the frequency range of 18,000 Hz to 90 kHz by electrical excitation. The oscillations are amplified by the sonotrode and largely transmitted to the surrounding medium (as a rule a liquid) via the end face. The mechanical amplitude of the sonotrode can be increased or reduced by installing a booster, wherein the ultrasonic power delivered into the medium can be continuously adjusted via the power control of the ultrasound processor.

If the pressure acting as a result of ultrasound is implemented with the energy indicated above, about 0.1 to about 60, preferably 1 to 30, and very particularly preferably 1 to 10 seconds will generally suffice to adequately level the surface of the applied washcoat suspension. The pressure of the air or gas stream directed onto the surface of the washcoat is particularly preferably greater than the flow limit of the washcoat. Once the flow limit is exceeded, the structurally viscous washcoat starts to flow and can thus easily smooth irregularities in the liquid surface.

In a further preferred embodiment of the invention, the shear force acting in the form of pressure can also be generated by a gas/air stream from a nozzle. Such gas/air nozzles are known to the person skilled in the art. So-called slot or knife nozzles are preferably used for generating laminar air streams (https://de.wikipedia.org/wiki/Luftklinge). By way of example, FIGS. 1 to 3 show various embodiments of gas nozzles with which the gas, in particular air, can be directed onto the surface of the applied washcoat suspension. The energy input is effected, as stated, via a continuous or intermittent gas stream which exerts pressure on the surface of the structurally viscous washcoat suspension. The force which the gas/air stream thus exerts on the suspension surface leads to shearing and thus to liquefaction of the washcoat when the flow limit is exceeded.

A) Round Substrate Geometry

For catalyst substrates having a round substrate geometry, the following embodiments of the gas/air nozzles or sound generators are preferably used:
- movable flat nozzle with $I=d$ and continuous slot or individual holes which can be moved in the x direction over the substrate (FIG. 2a)
- fixedly mounted air brush having a diameter corresponding to the substrate and with a plurality of individual air openings (FIG. 3)
- rotatable flat nozzle having a length of $I=d$ or $I=d/2$ and a continuous slot or a plurality of individual holes (FIG. 1a-d)

The length of the nozzle (I) is matched to the diameter of the substrate (d), the nozzle typically being equal to or greater than the diameter of the substrate. However, nozzles having a nozzle length shorter than the diameter of the substrates may also be used, or parts of the substrate surface may be completely or partially separated from the gas/air stream by an attached solid or perforated gas/air protective metal sheet. In this way, different regions of the washcoat surface can be leveled. The pressure of the gas/air stream required to overcome the flow limit of the washcoat can be suitably adjusted by the person skilled in the art through the selection of the supplied gas/air pressure and the opening width of the air slot. The opening width of the slot of the nozzle is 0.1 to 5 mm; slot widths of 0.5 to 1 mm are preferably used.

Preferred embodiments as a rotatable flat nozzle with a length of $I=d$ or $I=d/2$ (d=diameter of the catalyst substrate) with (a) a continuous slot or (b) a plurality of individual holes as drawn by way of example in FIG. 1 are preferably used in substrates having round end-face geometries. Typical diameters of ceramic monoliths are in the order of 4 to 7 inches for applications in the passenger car sector.

With regard to the use of ultrasound or infrasound, a centrally mounted sound- or pressure-wave generator is suitable here; a high-frequency ultrasound resonator preferably being used.

B) Oval Substrate Geometry

For catalyst substrates having an oval substrate geometry, the following embodiments of the gas/air nozzles or sound generators are preferably used:
- movable flat nozzle with $I=d$ and continuous slot or individual holes which can be moved in the x direction over the substrate (FIG. 2a)
- fixedly mounted gas/air brush having a geometry corresponding to the substrate with a plurality of individual gas/air openings (FIG. 3)
- rotatable flat nozzle having a length of $I=d_{max}$ and a continuous slot or a plurality of individual holes ($d_{max}$ corresponds to the largest ellipse diameter of the oval substrate)

With regard to the use of ultrasound or infrasound, a fixedly mounted strip with a plurality of sound- or pressure-wave generators is suitable; a plurality of ultrasound resonators are preferably used.

The leveling unit, i.e., the unit for generating the continuous or pulsating gas/air stream, can additionally be movable in the z direction, as a result of which the volume flow of the gas impinging on the surface of the washcoat can be regulated, and the pressure required for overcoming the flow limit can thus be adjusted. Once the washcoat starts to flow, the distance of the air nozzle to the surface may be increased, which significantly reduces the risk of splashing.

The substrate monoliths to be provided with the washcoat suspension according to the present process are of the flow-through or wall-flow type. These substrate monoliths are generally cylindrical substrate bodies with a cylinder axis, two end faces, a lateral surface and an axial length L. They are honeycombed by a plurality of channels from the first end face to the second end face. In order to apply the washcoat suspension, the substrate monoliths are aligned vertically with the cylinder axis and the washcoat suspension is applied to the upper of the two end faces of the substrate monoliths.

In the prior art, flow-through monoliths are common catalyst substrates that can consist of metal or ceramic materials. Refractory ceramics, such as cordierite, silicon carbide or aluminum titanate, etc. are preferably used. The number of channels per area is characterized by the cell density that typically ranges between 300 and 900 cells per square inch (cpsi). The wall thickness of the channel walls in ceramics is between 0.5-0.05 mm.

All ceramic materials customary in the prior art can be used as wall-flow monoliths. Porous wall-flow filter substrates made of cordierite, silicon carbide, or aluminum titanate are preferably used. These wall-flow filter substrates have inlet and outlet channels, wherein the respective downstream ends of the inlet channels and the upstream ends of the outlet channels are offset against each other and closed with gas-tight "plugs." In this case, the exhaust gas that is to be purified and which flows through the filter substrate is forced to pass through the porous wall between the inlet channel and outlet channel, which delivers an excellent particulate filter effect. The filtration property for particulates can be designed by means of porosity, pore/radii distribution, and thickness of the wall. The catalyst material may be present in form of washcoat suspensions in and/or on the porous walls between the inlet and outlet channels. Wall-flow monoliths that were extruded directly or with the aid of binders from the corresponding catalyst materials, meaning that the porous walls directly consist of the catalyst material, such as can be the case in the case of SCR catalysts based on zeolite or vanadium, may also be used. Such extruded SCR monoliths can also be provided, as described above, with a washcoat suspension in and/or on the porous walls. Preferably used substrates may be taken from EP1309775A1, EP2042225A1 or EP1663458A1.

The washcoat suspensions used within the scope of the present invention are those typically used for the manufacture of motor vehicle exhaust gas catalysts. In the context of the present invention, the consistency of the washcoat suspension should be such that it does not run into the channels of the substrate monolith immediately after application. This can be achieved by various measures. For example, in an advantageous embodiment, the viscosity of the washcoat suspension can be adjusted in such a way (for example by additives, such as thixotropic agents (for example as in WO2016023808A1) or by adjusting the concentration of the constituents or amount of solvent used, by adjusting a certain temperature, etc.) that it penetrates into the channels only upon application of negative pressure at the lower end face and/or positive pressure at the upper end face of the substrate monoliths. Agents as contemplated in WO09947260A1, which help inhibit the penetration of the washcoat suspension into the substrate monolith (e.g., a closed iris or a permeable membrane), may also be used in this respect.

The suspensions considered here are structurally viscous (https://de.wikipedia.org/wiki/Strukturviskosit%C3% A4t), have solid bodies and contain the catalytically active components or their precursors as well as inorganic oxides, such as aluminum oxide, titanium dioxide, zirconium oxide, cerium oxide or combinations thereof, wherein the oxides can be doped with silicon or lanthanum, for example. Oxides of vanadium, chromium, manganese, iron, cobalt, copper, zinc, nickel, or rare earth metals, such as lanthanum, cerium, praseodymium, neodymium, promethium, samarium, europium, gadolinium, terbium, dysprosium, holmium, erbium, thulium, ytterbium, or combinations thereof may be used as catalytically active components. Noble metals, such as platinum, palladium, gold, rhodium, iridium, osmium, ruthenium, and combinations thereof may also be used as catalytically active components. These metals may also be present as alloys composed of each other or other metals, or as oxides. In the liquid coating medium, the metals may also be present as a precursor, such as nitrates, sulphites, or organyls of the said noble metals and mixtures thereof, and, in particular, palladium nitrate, palladium sulphite, platinum nitrate, platinum sulphite or $Pt(NH_3)_4(NO_3)_2$ may be used. The catalytically active component can then be obtained from the precursor by calcination at about 400° C. to about 700° C. The structurally viscous coating medium often has a solid content of between 35 and 52 wt. %. The viscosities of the washcoat suspension are generally between 0.015 and 100 Pa*s, preferably 0.1-50 Pa*s and particularly preferably 1-50 Pa*s (viscosity: DIN EN ISO 3104:1999-12). Depending on the chemical composition and additives used, different washcoats have different flow limits. According to the definition of EN ISO 3219-1, the flow limit is the shear stress above which the sample behaves like a liquid. The flow limit is thus the force needed to destroy the quiescent structure of a fabric and to allow a subsequent flowing as a liquid. According to the interactions of the washcoat constituents with one another, these suspensions often have differently high flow limits of 0.1 to more than 100 Pa.

According to the present invention, the coating suspension is applied to the substrate monoliths from above. For this purpose, the washcoat suspension is poured over the substrate monoliths, i.e. their upper end face, from above. This can take place according to the prior art. A possible method can be taken, for example, from EP2415522A1. After leveling, the washcoat suspension is sucked and/or pressed into the substrate monolith. In an advantageous embodiment of this variant, the substrate monoliths are previously either wrapped with a protective sleeve or provided from above with a vessel adapted to the shape of the end faces of the substrates so that the outer lateral surfaces of the substrate bodies do not come into contact with the coating suspension (see, for example, EP1900442A1). The layer of the washcoat suspension to be treated in the context of the present invention should not be too thick but also not too thin after application to the substrate monolith. As a rule, the layer thickness of the suspension on the substrate monolith after leveling will be in the range of 0.5-15 cm, preferably 1-10 cm and particularly preferably 2-8 cm, the thickness of the applied washcoat layer resulting from the amount of the suspension required for coating the channel walls of the substrate and its density and the size of the upper end face of the substrate. The amount of coating in turn depends on the surface of the area to be coated and on the desired layer thickness on the substrate.

Another object of the present invention is an apparatus for coating a substrate monolith of the flow-through or wall-flow type with a washcoat suspension. The apparatus allows the above-mentioned process to be carried out successfully. For this purpose, it is necessary according to the invention for the apparatus to comprise:

a unit for locking the substrate monolith in the upright position;
a unit for applying an amount of washcoat suspension to the upright substrate monolith;
a unit for generating a shear force in the form of pressure which is transmitted to the surface of the washcoat suspension by air or gas.

The unit for locking the substrate monolith in position is known to the person skilled in the art. Reference is made in this respect to WO2015140630A1, EP2321048B1 (the process station for the coating according to the invention can also be controlled via a rotary indexing table) or U.S. Pat. No. 4,609,563. If the substrate monolith is then present in the process station in an upright, reversibly locked manner, the further unit for applying an amount of washcoat suppression to the upright substrate monoliths becomes active. Such a unit can be taken, for example, from the aforementioned EP2415522A1. The unit for generating a shear force in the form of pressure which is transmitted to the surface of the washcoat suspension by air or gas subsequently comes into play. Reference is made to the above statements regarding the process. It goes without saying that the procedures and preferred embodiments described for the process also apply mutatis mutandis to the apparatus and vice versa.

The contactless leveling of an irregularly shaped washcoat surface preferably takes place via a laminar or turbulent, continuous or a periodically intermittent air/gas stream. The generation of the continuous gas stream can be achieved in this case by positive pressure. For the leveling, it is then directed onto the surface of the thick washcoat layer via a rotatable or horizontally movable gas/air nozzle (air knife, air brush). A periodically occurring air/gas stream may be generated by a sound- or pressure-wave generator. Sound-wave generators in the infrasound and ultrasound range can be used in this case. The periodically occurring air/gas streams are preferably generated by a high-frequency ultrasound resonator, which is advantageously fixedly mounted centrally above the substrate monolith or freely movable in the plane or height. Leveling of the liquid surface can also be carried out by combining the two methods. In the course of the leveling operation, the energy introduced can be reduced continuously or stepwise either by increasing the distance of the smoothing unit to the surface or by reducing the air pressure or the resonator power.

Particularly preferred is an embodiment of the present apparatus in which the apparatus has a unit which is capable of forming a collar around the substrate monolith such that no washcoat suspension can run down the substrate monolith on the outside during the action of the shear force in the form of pressure. Reference is made in this respect to the literature (EP1900442A1).

It should lastly be noted that the apparatus according to the invention also provides a possibility of conveying the applied and leveled washcoat suspension into the substrate monolith. This is done by a further suction or pressure unit on the apparatus according to the invention. It is also possible and preferred to convey the washcoat suspension into the substrate monolith by both measures simultaneously. This leads to a more uniform formation of the coating profile in the substrate monolith. Suction and pressure units of this type are sufficiently familiar to the person skilled in the art (see literature in the introductory part).

For example, for this purpose, a vacuum may preferably be applied at the lower end face of the substrate monolith by, for example, opening a valve to an evacuated negative pressure tank. At the same time, air or another gas which is inert to the coated substrate monolith and the washcoat suspension, such as nitrogen, may, for example, be supplied under pressure to the upper end face of the substrate monolith. Likewise, this supply can also be alternated or reversed once or several times, which, according to U.S. Pat. No. 7,094,728B2, results in a more uniform coating of the channels within the substrate bodies.

Instead of applying a negative pressure ("sucking out" the substrate monoliths), a positive pressure may also be applied ("blowing out" the substrate monoliths). For this purpose, air or another gas which is inert with respect to the coated substrate monoliths and the washcoat suspension, such as nitrogen, is supplied under pressure to the upper or lower end face. In doing so, the end faces opposite the end faces to which air/gas pressure is being applied must ensure sufficient outflow of the gas. To this end, a negative pressure (vacuum) can be applied, although this is not absolutely necessary. However, an air/gas pressure should not also be applied from the opposite sides in order to ensure a flow rate sufficient to remove excess washcoat suspension from the channels of the substrate monoliths. In a way similar to the process according to U.S. Pat. No. 7,094,728B2, which is briefly outlined above, the positive pressure can in this case be applied alternately to the upper and lower end faces.

If necessary, the substrate monoliths can also be coated multiple times with washcoat suspensions. This can in principle take place before or after calcination of the previously applied washcoat suspension, or else after drying of the same by gas flowing through, the latter being preferred. In the case of a plurality of successive coating steps, the coating suspension can have the same or a different composition to the previously applied washcoat suspension.

The substrate bodies are finally dried and subsequently subjected to a heat treatment (calcination).

The core of the present invention is that the leveling of the applied washcoat suspension before the coating takes place as completely as possible without contact and contamination or a change of the washcoat suspension can thus be completely ruled out. According to the invention, the application of force takes place only at the layers of the washcoat close to the surface and not in the complete suspension. The result of this procedure is that the rheological properties of the suspension change only close to the surface, i.e., liquefaction of the material by overcoming the flow limit takes place only at the surface. This successfully prevents the entire applied amount of washcoat from liquefying as a result of the shear thinning and from penetrating into the catalyst substrate in an uncontrolled manner before the pressure pulse is applied. Since the application of force for leveling also does not take place by movement or vibration of the substrate monolith, damage to the sensitive substrate is furthermore ruled out. The method is additionally characterized in that it does not require a complex mechanism for rotating or vibrating the substrate. By decoupling the leveling unit from the conveying system of the substrate, modular and simple adaptation of the apparatus to the different geometries and dimensions of the substrate monoliths is possible. The energy input required for smoothing the differently viscous washcoats can be easily adjusted via the process parameters gas/air pressure and nozzle geometry as well as via the infrasonic/ultrasonic frequency and distance from the surface.

It was an object of the present invention to develop a way of leveling an irregularly shaped surface of a washcoat suspension in which the energy input required for leveling occurs without direct contact with the washcoat and the leveling force acts only at the surface of the washcoat. This force action has thus no or at most slight effects on the rheological properties of the rest of the washcoat. Furthermore, by means of the procedure according to the invention for contactless surface leveling, the applied, measured amount of washcoat suspension ("metered charge") should remain unchanged.

The process according to the invention and the apparatus according to the invention guarantee a homogeneous coating of the substrate monoliths and thus enable a more uniform catalytic activity of the finished catalysts. In the case of zoned catalysts with different or identical washcoats, a clearly defined zone boundary is possible as a result of the straight termination of the coating front, which may have a positive effect on the pressure loss. In terms of production technology, the procedure according to the invention offers increased safety against local, uncontrolled escape of the coating suspension during the coating process. Leveling can prevent breaking of the washcoat so that the reject rate decreases in the case of a "metered charge" process in this way.

Leveling is the smoothing of greater elevation differences within the thick washcoat layer as opposed to surface smoothing of thin layers in order to achieve a high-quality, defect-free surface of the finished product.

FIG. 1:

The drawings in FIG. 1a-d represent various embodiments of a centrally rotatable gas/air nozzle. In this case, the length of the gas/air nozzle (flat nozzle, knife nozzle) is adapted to the diameter of the substrate. The type of gas/air stream can be influenced by the type and shape of the outlet opening. A laminar flow may be created by a continuous slot having a width of 0.5 to 5 mm, while a plurality of small outlet holes instead of the continuous slot generates a turbulent flow. A rotatably mounted flat nozzle can be rotated in a simple manner by a gas/air stream exiting orthogonally to the axis of rotation through a separate opening mounted at the end of the nozzle. Alternatively, other electrical or mechanical drives may also be used to rotate the nozzle.

FIG. 2:

FIG. 2 shows schematic diagrams of a gas/air nozzle, which is guided over the substrate in the x direction for the smoothing operation. This flat nozzle can also have a continuous slot or a multiplicity of individual air outlet holes.

FIG. 3:

The drawing shows a gas/air brush which corresponds in its size and shape (round, oval, angular) to the geometry of the substrate used. The discharge of the gas/air stream takes place through openings in the bottom plate, the size and number of which are selected in such a way that the resulting air stream can exert sufficient pressure on the washcoat surface to overcome the flow limit.

EXAMPLE 1

50 g of a structurally viscous washcoat having a viscosity of 370 mPa*s at a shear rate of 150/s and a solid content of 42% are placed in a tray. Due to the flow limit of the washcoat, an irregular surface is formed during pouring. To smooth the surface, an ultrasonic generator with a frequency of 20 kHz and a power of 4 kW is used. Sound generation and transmission to the surrounding air takes place via a circular sonotrode with an end face of 3.8 cm$^2$. After the ultrasonic generator is switched on, the distance between the sonotrode and the surface of the washcoat is continuously reduced until, at a distance of 1 to 2 cm, the sound pressure of the air waves generated by the ultrasonic oscillation effects a smoothing of the surface. The sound pressure required for smoothing can also be adjusted by controlling the ultrasonic power itself.

EXAMPLE 2

The washcoat of Example 1 is placed in a tray. Due to the pronounced flow limit of the washcoat used (approx. 100 Pa), an irregular surface is formed during filling into the tray. A flat nozzle having a slot width of 1 mm and a slot length of 6 cm is mounted above the surface of the washcoat. The knife nozzle is connected to a compressed air supply and operated at an air pressure of 6 bar. By lowering the nozzle to the surface of the ceramic suspension, at a distance of 10 cm from the surface, the flow limit of the washcoat is overcome and the liquid surface is leveled by the generated pressure of the air stream. The entire surface can be smoothed by a linear movement of the nozzle. By suitable selection of the parameters for the slot width, nozzle distance from the surface of the washcoat and air pressure, the person skilled in the art can select the performance of the generated laminar air stream such that the pressure applied to the liquid surface can be adjusted in a targeted manner to the flow limit of the washcoat used in each case.

The invention claimed is:

1. A process for coating a substrate monolith of the flow-through or wall-flow type with a washcoat suspension, characterized in that
the washcoat suspension is applied from above to one end of an upright substrate monolith in a first step,
a shear force in the form of pressure transmitted by gas is allowed in a subsequent step to act on a surface of the washcoat suspension in order to level it in a contactless manner, and
the washcoat suspension is subsequently sucked into and/or pressed into the substrate monolith, and wherein the washcoat suspension provided to the one end of the upright substrate monolith in the first step has a thickness of 0.5-15 cm prior to the washcoat suspension being sucked into and/or pressed into the substrate monolith, and wherein the shear force, which is directed into the thickness of the washcoat suspension provided to the one end of the upright substrate monolith in the first step, is applied only to a region of the thickness of the washcoat suspension and not to the entire thickness of the washcoat suspension.

2. Process according to claim 1, characterized in that the shear force is generated by a method selected from the group consisting of a continuous gas stream, a pulsating gas stream, or a mixture thereof.

3. Process according to claim 1, characterized in that the pressure transmitted by gas on the washcoat suspension is reduced continuously or stepwise during a duration of the transmitting.

4. Process according to claim 1, characterized in that the pressure transmitted is generated by a pulsating gas/air stream from a sound- or pressure-wave generator.

5. Process according to claim 4, characterized in that the pressure transmitted is generated at a frequency of about 18,000 to about 90,000 Hz.

6. Process according to claim 4, characterized in that the pressure transmitted is generated by ultrasound for a period of about 0.1 to about 60 seconds.

7. Process according to claim 1, characterized in that the pressure transmitted is generated by a gas/air stream from an air nozzle.

8. Process according to claim 1, characterized in that the washcoat suspension has a viscosity of 0.01 to 100 Pa*s.

9. Process according to claim 8, wherein the viscosity of the washcoat suspension is from 0.1 to 100 Pa*s.

10. Process according to claim 8, wherein the viscosity of the washcoat suspension is from 1 to 50 Pa*s.

11. Process according to claim 1, wherein the washcoat suspension on the substrate monolith has a thickness of 1-10 cm.

12. Process according claim 1, wherein the washcoat suspension on the substrate monolith has a thickness of 2-8 cm.

13. Process according to claim 1, wherein an application of the force of the pressure transmitted is applied downward into the surface of the washcoat suspension in a sufficient amount to overcome the flow limit of the surface of the washcoat suspension while avoiding application to a complete washcoat suspension such that the application of the force avoids the washcoat suspension from liquefying in a manner that allows for penetration of the washcoat suspension into the substrate monolith during application of the force of the pressure transmitted and prior to washcoat suspension being subsequently sucked into and/or pressed into the substrate monolith.

14. Process according to claim 1, wherein the pressure transmitted on the washcoat suspension is reduced continuously or stepwise during a duration of the transmitting by one or both of a height variation in a source of the pressure transmitted or a reduction in air pressure or resonator power generated by the source of the pressure transmitted by gas.

15. Process according to claim 1, wherein the pressure transmitted is greater than the flow limit of the washcoat suspension which has a viscosity of 0.1 to 50 Pa*s.

16. Process according to claim 1, wherein a source of the pressure transmitted retains a constant Z-axis orientation during transmission with the Z-axis extending in a height direction.

17. A process for coating a substrate monolith of the flow-through or wall- flow type with a washcoat suspension, characterized in that
the washcoat suspension is applied from above to one end of an upright substrate monolith in a first step,
a shear force in the form of pressure transmitted by gas is allowed in a subsequent step to act on a surface of the washcoat suspension in order to level it in a contactless manner, and
the washcoat suspension is subsequently sucked into and/or pressed into the substrate monolith, and
wherein the washcoat suspension provided to the one end of the upright substrate monolith in the first step has a thickness of 0.5-15 cm prior to the washcoat suspension being sucked into and/or pressed into the substrate monolith, and
wherein the washcoat suspension has a viscosity of 0.1 to 50 Pa*s, and
wherein the shear force is greater than the flow limit of the surface of the washcoat suspension having the viscosity of 0.1 to 50 Pa*s as to put the surface of the washcoat suspension into a flowable state as to enable removal of irregularities in the surface of the washcoat suspension,
wherein the pressure transmitted by gas on the washcoat suspension is reduced continuously or stepwise during a duration of the transmitting, and
wherein the pressure transmitted on the washcoat suspension is reduced continuously or stepwise during a duration of the transmitting by one or both of a height variation in a source of the pressure transmitted or a reduction in air pressure or resonator power generated by the source of the pressure transmitted by gas.

18. A process for coating a substrate monolith of the flow-through or wall-flow type with a washcoat suspension, characterized in that the washcoat suspension is applied from above to one end of an upright substrate monolith in a first step, a shear force in the form of pressure transmitted by gas is allowed in a subsequent step to act on a surface of the washcoat suspension in order to level it in a contactless manner, and the washcoat suspension is subsequently sucked into and/or pressed into the substrate monolith, and wherein the washcoat suspension provided to the one end of the upright substrate monolith in the first step has a thickness of 0.5-15 cm prior to the washcoat suspension being sucked into and/or pressed into the substrate monolith, and wherein the washcoat suspension has a viscosity of 0.1 to 50 Pa*s, and wherein the shear force is greater than the flow limit of the surface of the washcoat suspension having the viscosity of 0.1 to 50 Pa*s as to put the surface of the washcoat suspension into a flowable state as to enable removal of irregularities in the surface of the washcoat suspension, wherein the pressure transmitted is generated by a pulsating gas/air stream from a sound- or pressure-wave generator, and wherein the sound- or pressure-wave generator is lifted in height away from the substrate monolith while still in operation.

19. A Process process for coating a substrate monolith of the flow-through or wall-flow type with a washcoat suspension, characterized in that the washcoat suspension is applied from above to one end of an upright substrate monolith in a first step, a shear force in the form of pressure transmitted by gas is allowed in a subsequent step to act on a surface of the washcoat suspension in order to level it in a contactless manner, and the washcoat suspension is subsequently sucked into and/or pressed into the substrate monolith, and wherein the washcoat suspension provided to the one end of the upright substrate monolith in the first step has a thickness of 0.5-15 cm prior to the washcoat suspension being sucked into and/or pressed into the substrate monolith, wherein the pressure transmitted is generated by a gas/air stream from an air nozzle, and wherein, upon initiation of washcoat suspension flow, the air nozzle is lifted away from the substrate monolith while still in operation.

* * * * *